United States Patent
Hsiang

(10) Patent No.: US 11,595,690 B2
(45) Date of Patent: *Feb. 28, 2023

(54) METHODS AND APPARATUS FOR SIMPLIFICATION OF CODING RESIDUAL BLOCKS

(71) Applicant: MEDIATEK INC., Hsinchu (TW)

(72) Inventor: Shih-Ta Hsiang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/507,067

(22) Filed: Oct. 21, 2021

(65) Prior Publication Data

US 2022/0046283 A1  Feb. 10, 2022

Related U.S. Application Data

(63) Continuation of application No. 16/941,834, filed on Jul. 29, 2020, now Pat. No. 11,184,642.
(Continued)

(51) Int. Cl.
*H04N 19/61* (2014.01)
*H04N 19/70* (2014.01)
(Continued)

(52) U.S. Cl.
CPC ........... *H04N 19/61* (2014.11); *H04N 19/105* (2014.11); *H04N 19/176* (2014.11); *H04N 19/70* (2014.11)

(58) Field of Classification Search
CPC .... H04N 19/105; H04N 19/13; H04N 19/136; H04N 19/176; H04N 19/18; H04N 19/61; H04N 19/70; H04N 19/91
See application file for complete search history.

(56) References Cited

U.S. PATENT DOCUMENTS

2014/0307800 A1* 10/2014 Sole Rojals ......... H04N 19/176
                                                                375/240.18
2015/0016537 A1    1/2015 Karczewicz et al.
(Continued)

OTHER PUBLICATIONS

Chinese language office action dated Sep. 19, 2021, issued in application No. TW 109125980.

*Primary Examiner* — Anner N Holder
(74) *Attorney, Agent, or Firm* — McClure, Qualey & Rodack, LLP

(57) ABSTRACT

Method and apparatus for encoding and decoding prediction residues in a video coding system also disclosed. At the decoder side, a Rice parameter for the target transform coefficient is determined based on a local sum of absolute levels of neighboring transform coefficients of the target transform coefficient. A dependent quantization state is determined and a zero-position variable is determined based on the dependent quantization state and the Rice parameter. One or more coded bits associated with a first syntax element for the target transform coefficient in a transform block are parsed and decoded using one or more codes including a Golomb-Rice code with the Rice parameter, where the first syntax element corresponds to a modified absolute level value of the target transform coefficient. An absolute level value of the target transform coefficient is derived according to the zero-position variable and the first syntax element.

16 Claims, 5 Drawing Sheets

Related U.S. Application Data

(60) Provisional application No. 62/903,987, filed on Sep. 23, 2019, provisional application No. 62/881,969, filed on Aug. 2, 2019.

(51) Int. Cl.
*H04N 19/105* (2014.01)
*H04N 19/176* (2014.01)

(56) References Cited

U.S. PATENT DOCUMENTS

| | | | |
|---|---|---|---|
| 2016/0205412 A1* | 7/2016 | Kim | H03M 7/4018 |
| | | | 375/240.18 |
| 2016/0212427 A1 | 7/2016 | Yoneoka | |
| 2017/0064336 A1 | 3/2017 | Zhang et al. | |
| 2020/0077117 A1 | 3/2020 | Karczewicz et al. | |
| 2020/0186814 A1 | 6/2020 | Karczewicz et al. | |
| 2020/0267389 A1 | 8/2020 | George et al. | |

\* cited by examiner

US 11,595,690 B2

METHODS AND APPARATUS FOR SIMPLIFICATION OF CODING RESIDUAL BLOCKS

CROSS REFERENCE TO RELATED APPLICATIONS

The present invention is a Continuation of pending U.S. patent application Ser. No. 16/941,834, filed on Jul. 29, 2020, issued Nov. 23, 2021, as U.S. Pat. No. 11,184,642, which claims priority to U.S. Provisional Patent Application, Ser. No. 62/881,969 filed on Aug. 2, 2019 and U.S. Provisional Patent Application, Ser. No. 62/903,987 filed on Sep. 23, 2019. The U.S. Provisional Patent Applications are hereby incorporated by reference in their entireties.

FIELD OF THE INVENTION

The present invention relates to transform coding of prediction residuals in a video encoder and decoder. In particular, the present invention discloses methods to reduce the complexity for coding process of transform coefficients.

BACKGROUND AND RELATED ART

The High Efficiency Video Coding (HEVC) (Rec. ITU-T H.265|ISO/IEC 23008-2 version 3: High efficiency video coding, April, 2015) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into non-overlapped square block regions represented by coding tree units (CTUs). A coded picture can be represented by a collection of slices, each comprising an integer number of CTUs. The individual CTUs in a slice are processed in a raster scanning order. A bi-predictive (B) slice may be decoded using Intra prediction or inter prediction using at most two motion vectors and reference indices to predict the sample values of each block. A predictive (P) slice is decoded using Intra prediction or inter prediction using at most one motion vector and reference index to predict the sample values of each block. An Intra (I) slice is decoded using Intra prediction only.

FIG. 1A illustrates an exemplary adaptive Inter/Intra video coding system incorporating loop processing. For Inter/Intra prediction block 110 generates prediction signal using Inter or Intra prediction adaptive for each coding block (e.g. a CU). The Inter prediction signal may use the current block from the Input video and one or more reference pictures from the Frame Buffer 134 to derive motion estimation. On the other hand, the Intra prediction signal uses the current block from the Input video and neighboring blocks of the currently reconstructed picture from the reconstruction block (REC) 128 to derive Intra prediction signal. The prediction signal is subtracted from the original signal using the subtractor 116 to generate the residual signal. The residual signal is then processed by transform block (T) 118 and quantization block (Q) 120 to generate quantized-transformed residual (i.e., quantized coefficients), which is further processed by Entropy encoder 122 to be included in the output bitstream. At the encoder side, when an Inter-prediction mode is used, a reference picture or pictures have to be reconstructed at the encoder end as well. When an Intra mode is used, the reconstructed neighboring blocks will be used. Therefore, an Intra coded block needs to be reconstructed for later use by subsequent blocks coded in the Intra mode. Consequently, the transformed and quantized residues are processed by Inverse Quantization (IQ) 124 and Inverse Transformation (IT) 126 to recover the residues. The reconstructed residues are then added back to prediction signal by the REC 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, Deblocking filter (DF) 130 is often applied to the reconstructed video data before the reconstructed video data are stored in the Frame Buffer 134 in order to improve video quality. Beside deblocking filter, other loop filters (referred as Non-deblocking filters, NDFs) 132, such as Sample Adaptive Offset (SAO) may be used. The system in FIG. 1A is intended to illustrate an exemplary structure of a typical video encoder.

FIG. 1B illustrates a corresponding decoder structure, where most blocks are already used in the encoder. However, at the decoder side, an Entropy Decoder 140 is used instead of the Entropy Encoder 122. Furthermore, the Inter/Intra Prediction Block 150 for the decoder side is different from that at the encoder side since the motion compensation is performed at the decoder side.

A CTU can be partitioned into multiple non-overlapped coding units (CUs) using the recursive quadtree (QT) structure to adapt to various local motion and texture characteristics. One or more prediction units (PU) are specified for each CU. The prediction unit, together with the associated CU syntax, works as a basic unit for signaling the predictor information. The specified prediction process is employed to predict the values of the associated pixel samples inside the PU. A CU can be further partitioned using the residual quadtree (RQT) structure for representing the associated prediction residual signal. The leaf nodes of the RQT correspond to the transform units (TUs). A transform unit is comprised of a transform block (TB) of luma samples of size 8×8, 16×16, or 32×32 or four transform blocks of luma samples of size 4×4, and two corresponding transform blocks of chroma samples of a picture in 4:2:0 color format. An integer transform is applied to a transform block and the level values of quantized coefficients together with the other side information are entropy coded in the bitstream. FIG. 2 illustrates an example of the block partitioning 210 and its corresponding QT representation 220. The solid lines indicate the CU boundaries and the dashed lines indicate the TU boundaries.

The terms coding tree block (CTB), coding block (CB), prediction block (PB), and transform block (TB) are defined to specify the 2-D sample array of one color component associated with CTU, CU, PU and TU, respectively. A CTU consists of one luma CTB, two chroma CTBs, and associated syntax elements. A similar relationship is valid for CU, PU and TU. The tree partitioning is generally applied simultaneously to both luma and chroma, although exceptions apply when certain minimum sizes are reached for chroma.

Joint Video Expert Team (JVET) of ITU-T SG16 WP3 and ISO/IEC JTC1/SC29/WG11 are currently in the process of establishing the next-generation video coding standard. Some promising new coding tools have been adopted into Versatile Video Coding (VVC) Working Draft (WD) 6 (B. Brossey et al., "Versatile Video Coding (Draft 2)," Joint Video Expert Team (JVET) of ITU-T VCEG (Q6/16) and ISO/IEC MPEG (JTC 1/SC 29/WG 11), Doc. JVET-O2001, 15th Meeting: Gothenburg, SE, 3-12 Jul. 2019). In VVC WD 2 (i.e., JVET-K1001), each coding tree unit (CTU) can be partitioned into one or more smaller-size coding units (CUs) by a quadtree with nested multi-type tree using binary and ternary split. The resulting CU partitions can be in square or rectangular shapes.

In HEVC, the coded block flag (CBF) is utilized to signal if there is any non-zero transform coefficient in a transform block. When the CBF is equal to 0, the associated transform block is not further coded and all the coefficients in the current transform block are inferred to be equal to 0. Otherwise, the associated transform block contains at least one nonzero transform coefficient. A nonzero transform block is further divided into non-overlapped subblocks. A syntax element, coded_sub_block_flag may be signaled to indicate whether a current subblock contains any nonzero coefficient. When coded_sub_block_flag is equal to 0, the associated transform subblock is not further coded and all the coefficients in the current transform subblock are inferred to be equal to 0. Otherwise, the associated transform block contains at least one non-zero transform coefficient. The values of the transform coefficient levels in the associated subblock are entropy coded using multiple subblock coding passes. In each coding pass, the individual transform coefficients are visited once according to a pre-defined scanning order.

In HEVC, a syntax element, sig_coeff_flag is signaled in the first subblock coding pass to indicate whether the absolute value of a current transform coefficient level is greater than 0. A syntax element, coeff_abs_level_greater1_flag is further signaled in the second coding pass for a current coefficient with sig_coeff_flag equal to 1 to indicate whether the absolute value of the associated transform coefficient level is greater than 1. A syntax element, coeff_abs_level_greater2_flag is further signaled in the third coding pass for a current coefficient with coeff_abs_level_greater1_flag equal to 1 to indicate whether the absolute value of the associated transform coefficient level is greater than 2. The sign information and the remaining level values are further signaled by syntax elements, coeff_sign_flag and coeff_abs_level_remaining in the fourth coding and fifth subblock coding passes, respectively.

For VVC WD 6 as specified in JVET-O2001, the transform coefficients may be quantized by dependent scalar quantization using two quantizers of different deadzone sizes. The selection of one of the two quantizers is specified by a state machine with four states (represented by a quantization state, Qstate). The state for a current transform coefficient is determined by the state and the parity of the absolute level value for the preceding transform coefficient in scanning order. The transform blocks are partitioned into non-overlapped sub-blocks. The transform coefficient levels in each subblock are entropy coded using multiple sub-block coding passes. The syntax elements, sig_coeff_flag, abs_level_gt1_flag, par_level_flag and abs_level_.gt3_flag are signaled in the first subblock coding pass. The syntax elements abs_level_gt1_flag and abs_level_.gt3_flag indicate whether the absolute value of the current coefficient level are greater than 1 and greater than 3, respectively. The syntax element par_level_flag specifies the party bit of the absolute value of the current level. The partially reconstructed absolute value of a transform coefficient level from the first pass is given by:

$$AbsLevelPass1=sig\_coeff\_flag+par\_level\_flag+abs\_level\_gt1\_flag+2*abs\_level\_gt3\_flag.$$

Context selection for entropy coding, sig_coeff_flag is dependent on the state for the current coefficient. Syntax, par_level_flag is thus signaled in the first coding pass for deriving the state for the next coefficient. The syntax elements abs_remainder, and coeff_sign_flag are further signaled in the second, and third coding passes, respectively. The fully reconstructed absolute value of a transform coefficient level is given by:

$$AbsLevel=AbsLevelPass1+2*abs\_remainder.$$

The transform coefficient level is given by:

$$TransCoeffLevel=(2*AbsLevel-(QState>1?1:0))*(1-2*coeff\_sign\_flag),$$

where QState indicates the state for the current transform coefficient.

For achieving high compression efficiency, the context-based adaptive binary arithmetic coding (CABAC) mode, or known as regular mode, is employed for entropy coding the values of the syntax elements in HEVC and VVC WD 6. FIG. 3 illustrates an exemplary block diagram of the CABAC process. Since the arithmetic coder in the CABAC engine can only encode the binary symbol values, the CABAC process needs to convert the values of the syntax elements into a binary string using a binarizer (310). The conversion process is commonly referred to as binarization. During the coding process, the probability models are gradually built up from the coded symbols for the different contexts. The context modeler (320) serves the modelling purpose. During normal context based coding, the regular coding engine (330) is used, which corresponds to a binary arithmetic coder. The selection of the modeling context for coding the next binary symbol can be determined by the coded information. Symbols can also be encoded without the context modeling stage and assume an equal probability distribution, commonly referred to as the bypass mode, for reduced complexity. For the bypassed symbols, a bypass coding engine (340) may be used. As shown in FIG. 3, switches (S1, S2 and S3) are used to direct the data flow between the regular CABAC mode and the bypass mode. When the regular CABAC mode is selected, the switches are flipped to the upper contacts. When the bypass mode is selected, the switches are flipped to the lower contacts as shown in FIG. 3.

In HEVC, the values of the syntax elements, coded_sub_block_flag, sig_coeff_flag, coeff_abs_level_greater1_flag, and coeff_abs_level_greater2_flag in a transform subblock are coded in the regular mode. The values of the syntax elements coeff_sign_flag and coeff_abs_level_remaining in a transform subblock are coded in the bypass mode. In order to limit the total number of the regular bins (or said context-coded bins) for entropy coding transform coefficient levels in a sub-block under the worst-case scenario, each subblock only allows to code up to eight coeff_abs_level_greater1_flag values and one coeff_abs_level_greater2_flag value. In this way, the maximum number of the regular bins in each subblock can be limited to 26.

BRIEF SUMMARY OF THE INVENTION

A method and apparatus for encoding prediction residues in a video coding system are disclosed. According to this method, quantized transform coefficients for a transform block to be coded are received at an encoder side. A Rice parameter for a target transform coefficient in the transform block is determined based on a local sum of absolute levels of neighboring transform coefficients of the target transform coefficient. A dependent quantization state is determined and a zero-position variable is determined based on the dependent quantization state and the Rice parameter. A first syntax element corresponding to a modified absolute level value of the target transform coefficient is derived according to the zero-position variable and an absolute level value of the target transform coefficient. A video bitstream comprising one or more coded bits for the first syntax element is generated, where said one or more coded bits are generated by binarizing the first syntax element using one or more codes comprising a Golomb-Rice code with the Rice parameter.

In one embodiment, the zero-position variable is derived according to one or more formulas with inputs comprising the dependent quantization state and the Rice parameter. For example, the dependent quantization state has 4 possible states and said one or more formulas comprise: if the dependent quantization state corresponds to first two possible states, the zero-position variable is set to be (1<<(the Rice parameter)) and "<<" corresponds to an arithmetic left-shift operation. If the dependent quantization state corresponds to second two possible states, the zero-position variable is set to be (2<<(the Rice parameter)). The first two possible states may have values of 0 and 1 and the second two possible states may have values of 2 and 3.

In one embodiment, the zero-position variable is determined conditionally based on the dependent quantization state and the Rice parameter.

A method and apparatus for decoding prediction residues in a video coding system are also disclosed. According to this method, a Rice parameter for the target transform coefficient is determined based on a local sum of absolute levels of neighboring transform coefficients of the target transform coefficient. A dependent quantization state is determined and a zero-position variable is determined based on the dependent quantization state and the Rice parameter. One or more coded bits associated with a first syntax element for the target transform coefficient in a transform block are parsed and decoded using one or more codes comprising a Golomb-Rice code with the Rice parameter, where the first syntax element corresponds to a modified absolute level value of the target transform coefficient. An absolute level value of the target transform coefficient is derived according to the zero-position variable and the first syntax element.

In one embodiment, if the first syntax element have a value equal to the zero-position variable, the absolute level value of the target transform coefficient can be set to 0. If the first syntax element have a value smaller than the zero-position variable, the absolute level value of the target transform coefficient can be set to (the first syntax element+ 1). If the first syntax element have a value greater than the zero-position variable, the absolute level value of the target transform coefficient can be set to the first syntax element.

DETAILED DESCRIPTION OF THE INVENTION

Figure 1A:
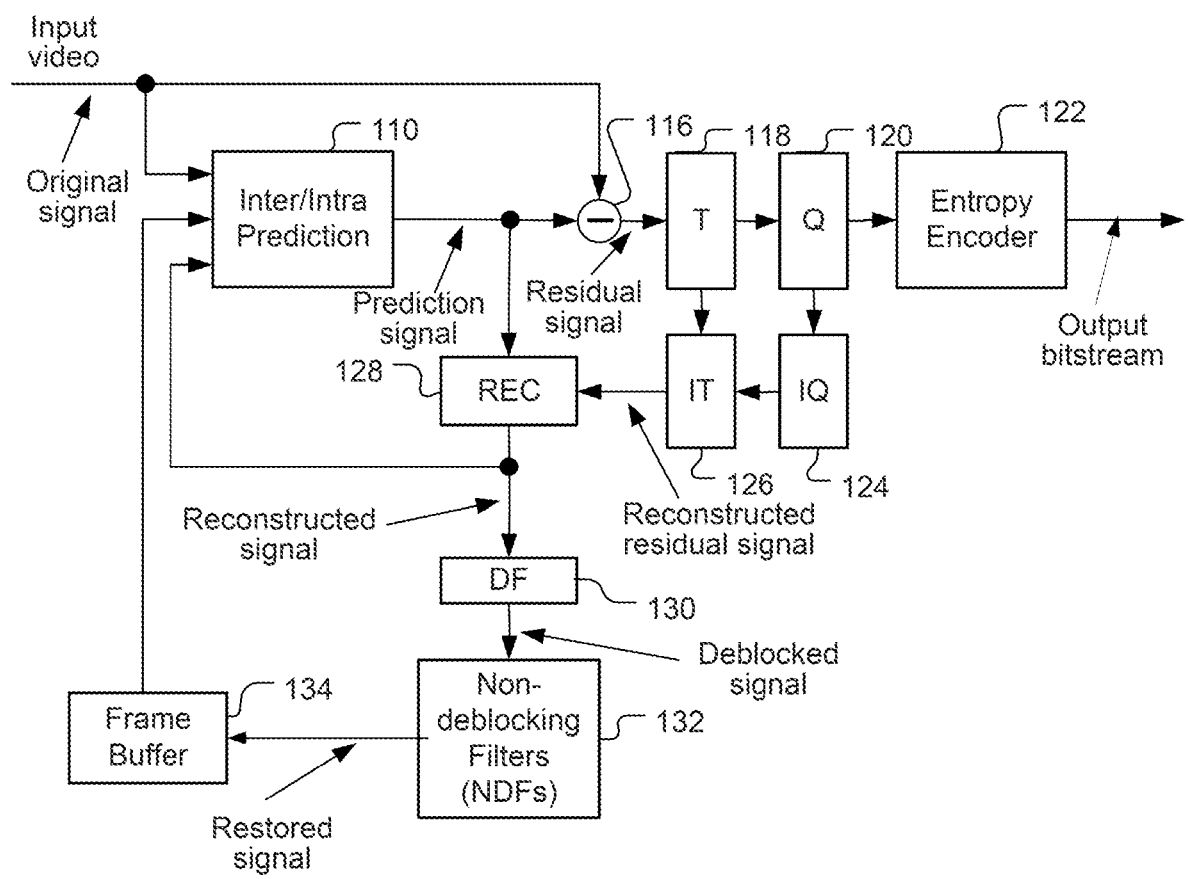
FIG. 1A illustrates an exemplary adaptive Inter/Intra video encoding system incorporating loop processing.
Figure 1B:
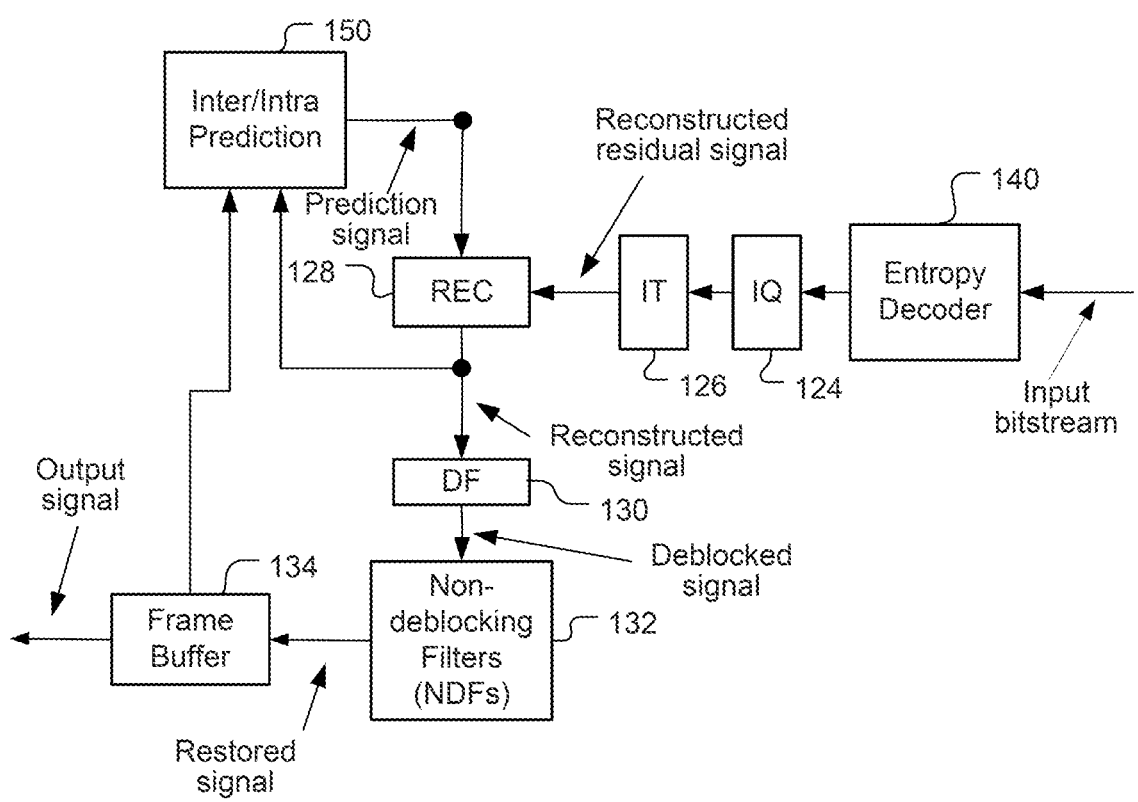
FIG. 1B illustrates an exemplary adaptive Inter/Intra video decoding system incorporating loop processing.
Figure 2:
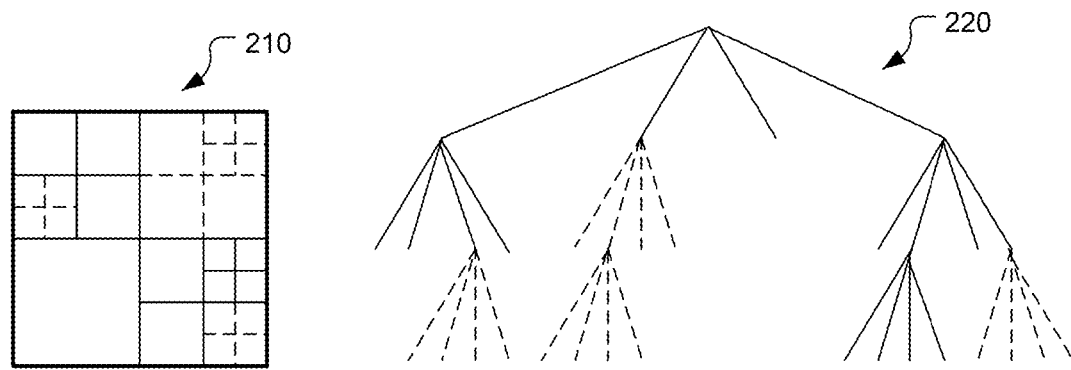
FIG. 2 illustrates an example of block partition using quadtree structure to partition a coding tree unit (CTU) into coding units (CUs).
Figure 3:
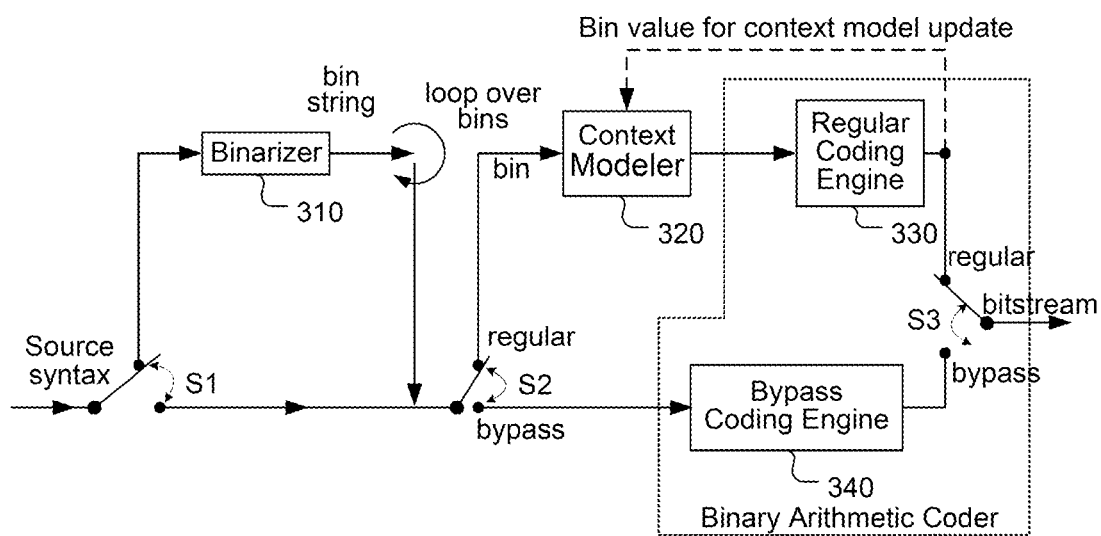
FIG. 3 illustrates an exemplary block diagram of the CABAC process.

The following description is of the best-contemplated mode of carrying out the invention. This description is made for the purpose of illustrating the general principles of the invention and should not be taken in a limiting sense. The scope of the invention is best determined by reference to the appended claims.

In VVC WD6 as specified in JVET-O2001, each transform block is allowed to consume up to 1.75 regular bins per coefficient for entropy coding transform coefficient levels in order to constrain the worst-case bitstream parsing throughput rate. The four syntax elements sig_coeff_flag, abs_level_gt1_flag, par_level_flag and abs_level_.gt3_flag in the first sub-block coding pass are entropy coded in the regular mode. When the remaining regular bin budget is less than 4 right before coding a next coefficient level, the first subblock coding pass terminates immediately. The absolute value of each of the remaining un-coded coefficients after the termination of the first subblock coding pass is represented in the bypass mode by the syntax element dec_abs_level, which corresponds to a modified absolute level value with the zero level value conditionally being mapped to a non-zero code-word value. Also, dec_abs_level[n] is considered as an intermediate value that is coded with Golomb-Rice code at the scanning position n. The fully reconstructed absolute value of a transform coefficient level associated with the block position (xC, yC) and the scanning position n are derived as follows:

If dec_abs_level[n] is equal to ZeroPos[n], AbsLevel[xC][yC] is set equal to 0.

Otherwise, if dec_abs_level[n] is less than ZeroPos[n], AbsLevel[xC][yC] is set equal to dec_abs_level[n]+1;

Otherwise, (dec_abs_level[n] is greater than ZeroPos[n]), AbsLevel[xC][yC] is set equal to dec_abs_level[n].

In the above statements, the value of the variable ZeroPos[n] is determined by the dependent scalar quantizer state (indicated by QState) and the sum of the absolute values of fully reconstructed coefficient levels of five neighboring coefficients (indicated by locSumAbs), as listed in Table 1 with the variable s set equal to Max(0, QState−1) and cRiceParam indicating the value of the selected Rice parameter for coding dec_abs_level.

TABLE 1

| The values of the variables cRiceParam and ZeroPos | | | | | | | | | | | | | | | | |
|---|---|---|---|---|---|---|---|---|---|---|---|---|---|---|---|---|
| s locSumAbs | 0 | 1 | 2 | 3 | 4 | 5 | 6 | 7 | 8 | 9 | 10 | 11 | 12 | 13 | 14 | 15 |
| cRiceParam | 0 | 0 | 0 | 0 | 0 | 0 | 0 | 1 | 1 | 1 | 1 | 1 | 1 | 1 | 2 | 2 |
| 0 ZeroPos[ n ] | 0 | 0 | 0 | 0 | 0 | 1 | 2 | 2 | 2 | 2 | 2 | 2 | 4 | 4 | 4 | 4 |
| 1 ZeroPos[ n ] | 1 | 1 | 1 | 1 | 2 | 3 | 4 | 4 | 4 | 6 | 6 | 6 | 8 | 8 | 8 | 8 |
| 2 ZeroPos[ n ] | 1 | 1 | 2 | 2 | 2 | 3 | 4 | 4 | 4 | 6 | 6 | 6 | 8 | 8 | 8 | 8 |

TABLE 1-continued

The values of the variables cRiceParam and ZeroPos

| locSumAbs | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|
| cRiceParam | 2 | 2 | 2 | 2 | 2 | 2 | 2 | 2 | 2 | 2 | 2 | 2 | 3 | 3 | 3 | 3 |
| 0 ZeroPos[ n ] | 4 | 4 | 4 | 4 | 4 | 4 | 4 | 8 | 8 | 8 | 8 | 8 | 16 | 16 | 16 | 16 |
| 1 ZeroPos[ n ] | 4 | 4 | 12 | 12 | 12 | 12 | 12 | 12 | 12 | 12 | 16 | 16 | 16 | 16 | 16 | 16 |
| 2 ZeroPos[ n ] | 8 | 8 | 12 | 12 | 12 | 12 | 12 | 12 | 12 | 12 | 16 | 16 | 16 | 16 | 16 | 16 |

The present invention discloses simplified methods for coding the absolute values of transform coefficients in a transform block under certain constraints on the number of regular bins. In the proposed methods, the transform coefficients in a sub-block are coded by a plurality of subblock coding passes under certain or specific constraints on the number of the consumed regular bins. The transform coefficients may be quantized by the dependent scalar quantization. The sub-block coding pass using regular bins may terminate early after the allocated regular bin budget under the specified constraints has been run out. The absolute value of each remaining un-coded coefficient after early termination is represented by a syntax element encoded or decoded in a bypass mode.

In Method 1, the value of the said syntax element is for encoding or decoding the absolute value of a remaining uncoded coefficient level is equal to the absolute value of the remaining un-coded coefficient level without remapping (instead of the modified absolute value) when the current coefficient corresponds to one of the specified one or more dependent quantization states. In some embodiments, a video coder as specified in the emerging VVC standard (e.g., in JVET-O2001) is modified according to the proposed method for encoding or decoding the syntax element dec_abs_level. However, remapping of the zero level value is not applied and AbsLevel[xC][yC] is always set equal to dec_abs_level[n] for one or more dependent quantization states. In another embodiment, remapping of the absolute level value is not applied to a remaining uncoded coefficient and AbsLevel[xC][yC] is always set equal to dec_abs_level[n] when the current coefficient corresponds to one of the specified one or more dependent quantization states. In one example, remapping of the zero level value for dec_abs_level is not applied for all dependent quantization states. In another example, remapping of the absolute level value is not applied for all dependent quantization states. In another example, remapping of the zero level value for dec_abs_level is not applied when variable s is equal to 0 and remapping of the zero level value for dec_abs_level is applied when variable s is equal to 1 or 2. In another example, remapping the absolute level value of the current remaining uncoded coefficient is not applied when s is equal to 0 and remapping the absolute level value is applied when s is equal to 1 or 2.

In Method 2, the value of the said syntax element is set equal to the modified absolute value of an un-coded coefficient with the zero level value conditionally being mapped to a nonzero code-word value for one or more dependent quantization states, wherein at least some part of the value range of the said syntax element is binarized by the (truncated) Rice binarization process or Exp-Golomb binarization process with the adaptively selected Rice parameter value. In another embodiment, the value of the said syntax element for encoding or decoding the absolute value of a remaining uncoded coefficient level corresponds to the modified absolute value of a uncoded coefficient level wherein the zero level value may be mapped to a determined syntax value and at least some part of the value range of the said syntax element is binarized by the (truncated) Rice binarization process or Exp-Golomb binarization process with the adaptively selected Rice parameter value. The proposed method further comprises deriving the codeword value for representing the zero level value from the selected Rice parameter for the current coefficient. In another embodiment, the proposed method further comprises deriving the selected Rice parameter value according to some specified method for binarization of the said syntax element. The proposed method further comprises deriving the syntax value for representing the zero level value from the selected Rice parameter for the current coefficient. In yet another embodiment, the proposed method further comprises deriving the modified absolute value of an un-coded coefficient level from the absolute value of a remaining uncoded coefficient level and the derived syntax value for the zero level value for encoding dec_abs_level or further comprises deriving the absolute value of a remaining uncoded coefficient level from the decoded value of dec_abs_level and the derived syntax value for the zero level value. In some embodiments, a video coder as specified in VVC (e.g., JVET-02001) is modified according to the proposed method for encoding or decoding the syntax element dec_abs_level or absolute value of a remaining uncoded coefficient level. In one example, when the variable s is equal to 0, the value of ZeroPos[n] is derived as follows:

$$ZeroPos[n]=(cRiceParam=0)?0:(1<<cRiceParam). \qquad (1)$$

In another example, when the variable s is equal to 1 or 2, the value of ZeroPos[n] is derived as follows:

$$ZeroPos[n]=(cRiceParam=0)?1:(2<<cRiceParam). \qquad (2)$$

In another example, when variable s is equal to 0, the value of ZeroPos[n] is derived as follows:

$$ZeroPos[n]=(cRiceParam=0)?1:(1<<cRiceParam). \qquad (3)$$

In another example, when the variable s is equal to 1 or 2, the value of ZeroPos[n] is derived as follows:

$$ZeroPos[n]=(cRiceParam=0)?2:(2<<cRiceParam). \qquad (4)$$

In the above equations, "<<" represents the arithmetic left shift operation. The meaning of logic operator "x? y: z" corresponds to "if x is TRUE or not equal to 0, evaluates to the value of y; otherwise, evaluates to the value of z". Accordingly, equation (1) means that:
  a. If (cRiceParam==0) is true, then ZeroPos[n] is set to 0.
  b. If (cRiceParam==0) is not true, then ZeroPos[n] is set to 1<<cRiceParam.
  Similarly, equation (2) means that:
  a. If (cRiceParam==0)==0 is true, then ZeroPos[n] is set to 1.
  b. If (cRiceParam==0) is not true, then ZeroPos[n] is set to 2<<cRiceParam.

Similarly, equation (3) means that:
a. If (cRiceParam==0) is true, then ZeroPos[n] is set to 1.
b. If (cRiceParam==0) is not true, then ZeroPos[n] is set to 1<<cRiceParam.

Similarly, equation (4) means that:
a. If (cRiceParam==0) is true, then ZeroPos[n] is set to 2.
b. If (cRiceParam==0) is not true, then ZeroPos[n] is set to 2<<cRiceParam.

Furthermore, the variable s set equal to Max(0, QState−1), the variable s equal to 0 implies that Qstate is equal to 0 or 1; and the variable s equal to 1 or 2 implies that Qstate is equal to 2 or 3.

Furthermore, it is noted that while equations (3) and (4) explicitly state the condition for cRiceParam to be 0 or not, the condition can be implied since (1<<cRiceParam)=1 and (2<<cRiceParam)=2 when cRiceParam is equal to 0. In other words, equation (3) is equivalent to ZeroPos[n]=(1<<cRiceParam) and equation (4) is equivalent to ZeroPos[n]=(2<<cRiceParam). Again, as mentioned before, equation (3) is for the case that the variable s is equal 0 (i.e., Qstate equal to 0 or 1) and equation (4) is for the case that the variable s is equal 1 or 2 (i.e., Qstate equal to 2 or 3). As is known in the art, the mathematical relationship as disclosed in equations (1) to (4) may have various representations for the same result. For example, the condition for the case of equation (3) is variable s equal to 0, and the condition can be equivalently described as Qstate equal to 0 or 1. Furthermore, the condition can also be stated as Qstate smaller than 2 (i.e., Qstate<2). On the other hand, the condition for the case of equation (4) is variable s equal to 1 or 2, and the condition can be equivalently described as Qstate equal to 2 or 3. This condition is also equivalent to (Qstate<2) being false.

The absolute value of the current remaining uncoded coefficient level at scanning position n can be derived from ZeroPos[n] and the decoded value of dec_abs_level according to the emerging VVC coding standard (e.g., JVET-O2001). According to a further aspect of Method 2, a video coder based on the emerging VVC coding standard (e.g., JVET-O2001) can derive the value of ZeroPos[n] from the selected cRiceParam only when the selected Rice parameter or the sum of the absolute values of the neighboring coefficients for decoding a current remaining uncoded coefficient is greater than a specified threshold value. In one example, when the selected Rice parameter value is less than 1, the value of ZeroPos[n] is determined according to Table 1. Otherwise, the value of ZeroPos[n] is derived from the selected Rice parameter value.

In Method 3, the value of the said syntax element is set equal to the modified absolute value of an un-coded coefficient with the zero level value conditionally being mapped to a nonzero code-word value for one or more dependent quantization states, wherein at least part of the value range of the said syntax element is binarized by the (truncated) Rice binarization process or Exp-Golomb binarization process with the adaptive Rice parameter value. The proposed method further comprises setting the value of the said syntax element equal to the absolute value of a uncoded coefficient without remapping when the selected Rice parameter or the sum of the absolute values of the neighboring coefficients is greater than a specified threshold value. In some embodiments, a video coder as specified in the emerging VVC coding standard (e.g., JVET-O2001) is modified according to the proposed method for encoding or decoding the syntax element dec_abs_level. In one example, remapping of the zero level value is not applied and AbsLevel[xC][yC] is always set equal to dec_abs_level[n] when cRiceParam is greater than a threshold value Tzero. The value of Tzero can be equal to 0, 1, or 2 in some embodiments.

It is noted that the proposed methods can be employed jointly. For example, a video coder as specified in the emerging VVC coding standard (e.g., JVET-O2001) can be modified according to the proposed methods for encoding or decoding the syntax element dec_abs_level. In some embodiments, when variable s is equal to 0, remapping of the zero level value for dec_abs_level is not applied. When variable s is equal to 1 or 2, remapping of the zero level value for dec_abs_level is applied and the value of ZeroPos[n] is derived by EQ (2).

Any of the foregoing proposed methods can be implemented in encoders and/or decoders. For example, any of the proposed methods can be implemented in an entropy coding module of an encoder, and/or an entropy coding module of a decoder. Alternatively, any of the proposed methods can be implemented as a circuit integrated to the entropy coding module of the encoder and/or the entropy coding module of the decoder.

Figure 4:
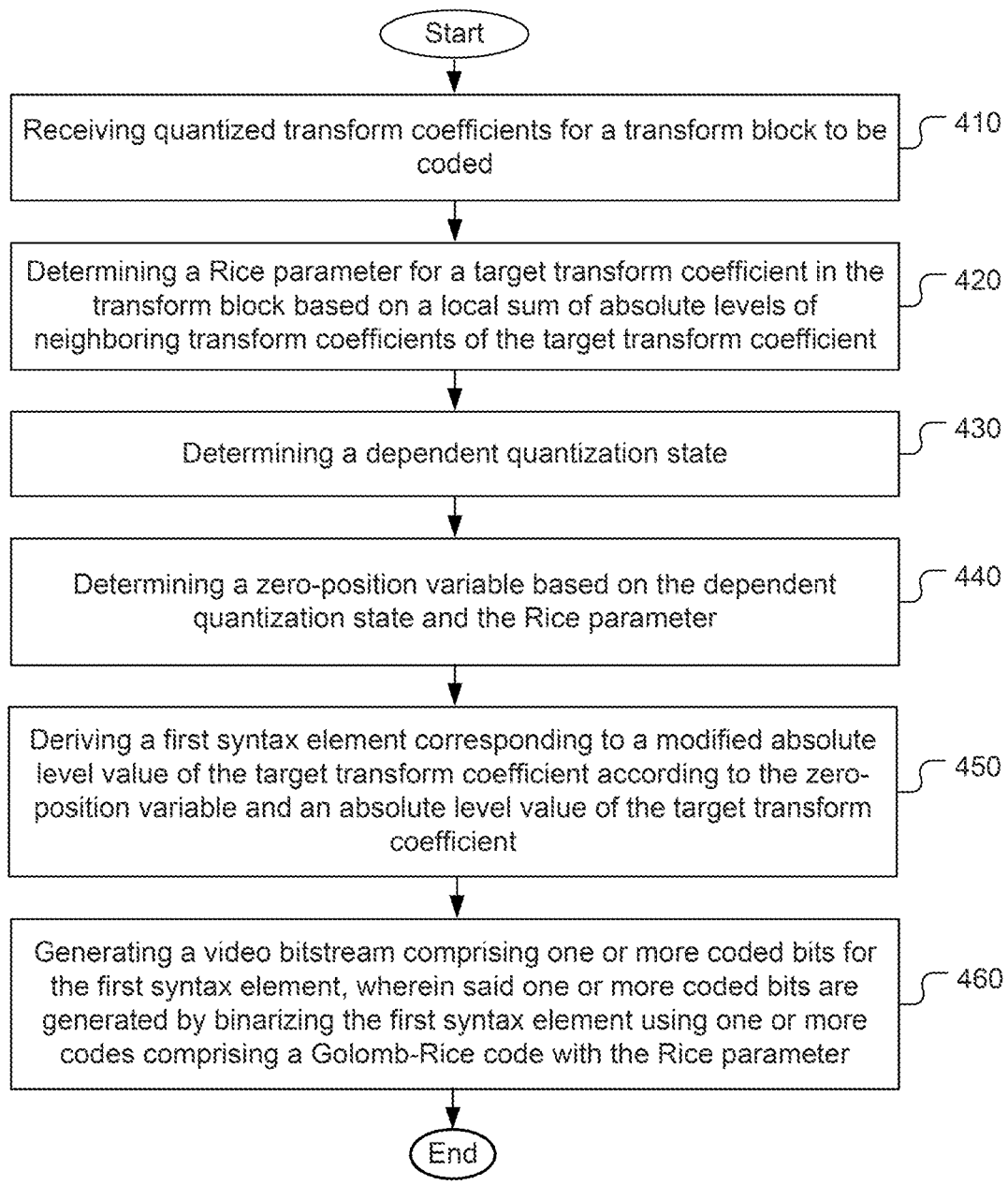
FIG. 4 illustrates a flowchart of an exemplary encoding system according to an embodiment of the present invention.

FIG. 4 illustrates a flowchart of an exemplary encoding system according to an embodiment of the present invention. The steps shown in the flowchart, as well as other following flowcharts in this disclosure, may be implemented as program codes executable on one or more processors (e.g., one or more CPUs) at the encoder side and/or the decoder side. The steps shown in the flowchart may also be implemented based hardware such as one or more electronic devices or processors arranged to perform the steps in the flowchart. According to this method, quantized transform coefficients for a transform block to be coded are received at an encoder side in step 410. A Rice parameter for a target transform coefficient in the transform block is determined based on a local sum of absolute levels of neighboring transform coefficients of the target transform coefficient in step 420. A dependent quantization state is determined in step 430 and a zero-position variable is determined based on the dependent quantization state and the Rice parameter in step 440. A first syntax element corresponding to a modified absolute level value of the target transform coefficient is derived according to the zero-position variable and an absolute level value of the target transform coefficient in step 450. A video bitstream comprising one or more coded bits for the first syntax element is generated in step 460, where said one or more coded bits are generated by binarizing the first syntax element using one or more codes comprising a Golomb-Rice code with the Rice parameter.

Figure 5:
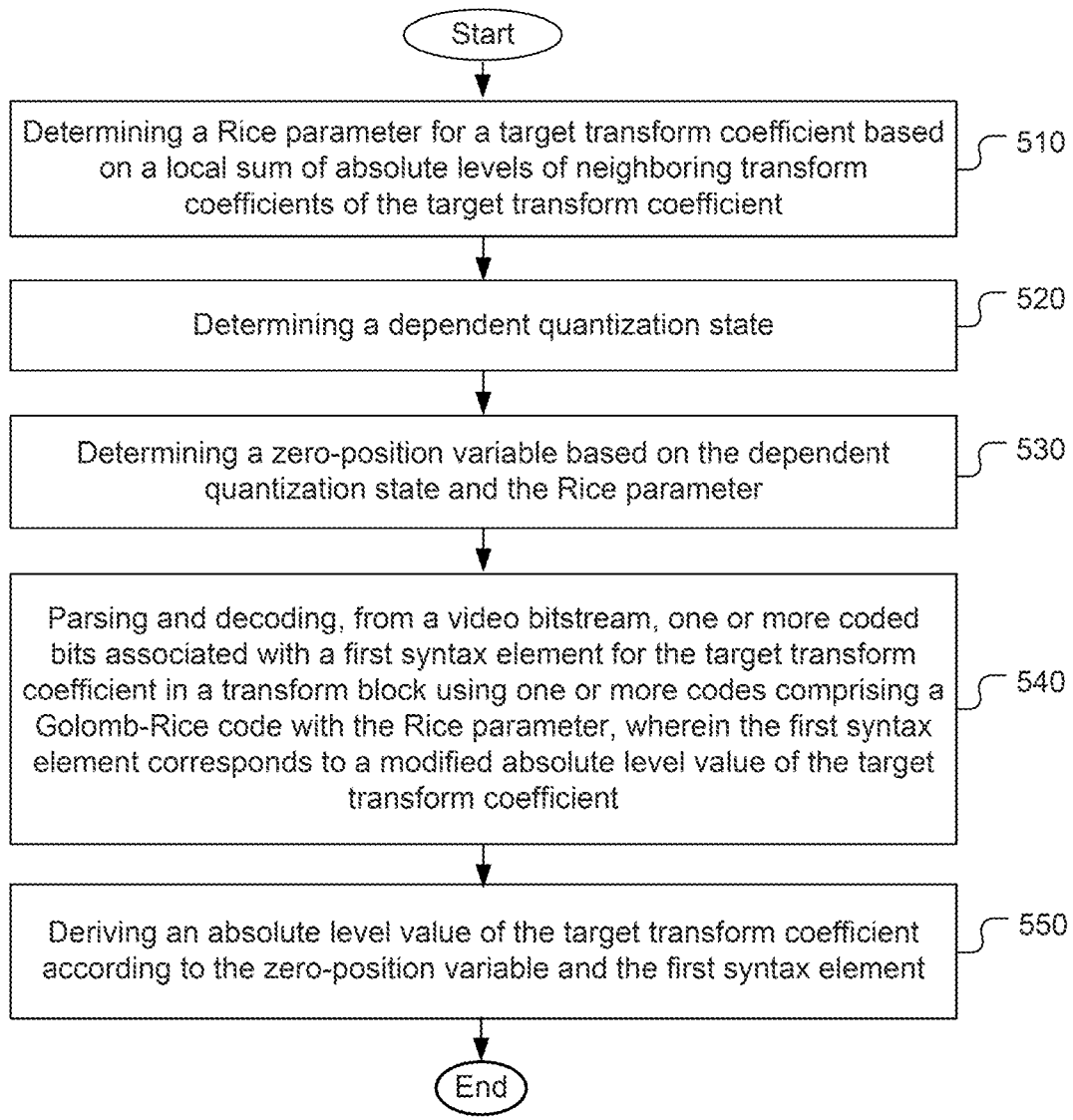
FIG. 5 illustrates a flowchart of an exemplary decoding system according to an embodiment of the present invention.

FIG. 5 illustrates a flowchart of an exemplary decoding system according to an embodiment of the present invention. According to this method, a Rice parameter for a target transform coefficient is determined based on a local sum of absolute levels of neighboring transform coefficients of the target transform coefficient in step 510. A dependent quantization state is determined in step 520 and a zero-position variable is determined based on the dependent quantization state and the Rice parameter in step 530. One or more coded bits associated with a first syntax element for the target transform coefficient in a transform block are parsed and decoded using one or more codes comprising a Golomb-Rice code with the Rice parameter, wherein the first syntax element corresponds to a modified absolute level value of the target transform coefficient in step 540. An absolute level value of the target transform coefficient is derived according to the zero-position variable and the first syntax element in step 550.

The flowcharts shown are intended to illustrate an example of video coding according to the present invention.

A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for encoding transform coefficients corresponding to prediction residues in a video coding system, the method comprising:
receiving quantized transform coefficients for a transform block to be coded;
determining a Rice parameter for a target transform coefficient in the transform block based on a local sum of absolute levels of neighboring transform coefficients of the target transform coefficient;
determining a dependent quantization state;
determining a zero-position variable based on the dependent quantization state and the Rice parameter;
determining, based on the zero-position variable and an absolute level value of the target transform coefficient, a value of a first syntax element corresponding to a modified absolute level value of the target transform coefficient; and
generating a video bitstream comprising one or more coded bits for the first syntax element, wherein said one or more coded bits are generated by binarizing the first syntax element using one or more codes comprising a Golomb-Rice code with the Rice parameter,
wherein if the absolute level value of the target transform coefficient is equal to 0, the value of the first syntax element is set equal to the zero-position variable.

2. The method of claim 1, wherein the zero-position variable is derived according to one or more formulas with inputs comprising the dependent quantization state and the Rice parameter.

3. The method of claim 2, wherein the dependent quantization state has 4 possible states and said one or more formulas comprise: if the dependent quantization state corresponds to first two possible states, the zero-position variable is set to be (1<<(the Rice parameter)) and "<<" corresponds to an arithmetic left-shift operation.

4. The method of claim 3, wherein said one or more formulas comprise: if the dependent quantization state corresponds to second two possible states, the zero-position variable is set to be (2<<(the Rice parameter)).

5. The method of claim 4, wherein the first two possible states have values of 0 and 1 and the second two possible states have values of 2 and 3.

6. The method of claim 1, wherein the zero-position variable is determined conditionally based on the dependent quantization state and the Rice parameter.

7. An apparatus for encoding transform coefficients corresponding to prediction residues in a video coding system, the apparatus comprising one or more electronic circuits or processors arranged to:
receive quantized transform coefficients for a transform block to be coded;
determine a Rice parameter for a target transform coefficient in the transform block based on a local sum of absolute levels of neighboring transform coefficients of the target transform coefficient;
determine a dependent quantization state;
determine a zero-position variable based on the dependent quantization state and the Rice parameter;
determine, based on the zero-position variable and an absolute level value of the target transform coefficient, a first syntax element corresponding to a modified absolute level value of the target transform coefficient; and
generate a video bitstream comprising one or more coded bits for the first syntax element, wherein said one or more coded bits are generated by binarizing the first syntax element using one or more codes comprising a Golomb-Rice code with the Rice parameter,
wherein if the absolute level value of the target transform coefficient is equal to 0, the value of the first syntax element is set equal to the zero-position variable.

8. A method for decoding transform coefficients corresponding to prediction residues in a video coding system, the method comprising:

determining a Rice parameter for a target transform coefficient based on a local sum of absolute levels of neighboring transform coefficients of the target transform coefficient;

determining a dependent quantization state;

determining a zero-position variable based on the dependent quantization state and the Rice parameter; and parsing and decoding, from a video bitstream, one or more coded bits associated with a first syntax element for the target transform coefficient in a transform block using one or more codes comprising a Golomb-Rice code with the Rice parameter, wherein the first syntax element corresponds to a modified absolute level value of the target transform coefficient;

deriving an absolute level value of the target transform coefficient according to the zero-position variable and the first syntax element, wherein if the first syntax element have a value equal to the zero-position variable, the absolute level value of the target transform coefficient is set to 0.

9. The method of claim 8, wherein the zero-position variable is derived according to one or more formulas with inputs comprising the dependent quantization state and the Rice parameter.

10. The method of claim 9, wherein the dependent quantization state has 4 possible states and said one or more formulas comprise: if the dependent quantization state corresponds to first two possible states, the zero-position variable is set to be (1<<(the Rice parameter)) and "<<" corresponds to an arithmetic left-shift operation.

11. The method of claim 10, wherein said one or more formulas comprise: if the dependent quantization state corresponds to second two possible states, the zero-position variable is set to be (2<<(the Rice parameter)).

12. The method of claim 11, wherein the first two possible states have values of 0 and 1 and the second two possible states have values of 2 and 3.

13. The method of claim 8, wherein the zero-position variable is determined conditionally based on the dependent quantization state and the Rice parameter.

14. The method of claim 8, wherein if the first syntax element have a value smaller than the zero-position variable, the absolute level value of the target transform coefficient is set to (the first syntax element+1).

15. The method of claim 8, wherein if the first syntax element have a value greater than the zero-position variable, the absolute level value of the target transform coefficient is set to the first syntax element.

16. An apparatus for decoding transform coefficients corresponding to prediction residues in a video coding system, the apparatus comprising one or more electronic circuits or processors arranged to:

determine a Rice parameter for a target transform coefficient based on a local sum of absolute levels of neighboring transform coefficients of the target transform coefficient;

determine a dependent quantization state;

determine a zero-position variable based on the dependent quantization state and the Rice parameter; and parse and decode, from a video bitstream, one or more coded bits associated with a first syntax element for the target transform coefficient in a transform block using one or more codes comprising a Golomb-Rice code with the Rice parameter, wherein the first syntax element corresponds to a modified absolute level value of the target transform coefficient;

derive an absolute level value of the target transform coefficient according to the zero-position variable and the first syntax element, wherein if the first syntax element have a value equal to the zero-position variable, the absolute level value of the target transform coefficient is set to 0.

* * * * *